United States Patent [19]
Kanno et al.

[11] Patent Number: 5,313,697
[45] Date of Patent: May 24, 1994

[54] METHOD OF MANUFACTURING A LINK ROD OF A WIPER FOR A MOTOR VEHICLE

[75] Inventors: Kazunobu Kanno, Toyohashi; Satoru Hamano, Kariya; Mikio Kawamura, Kasugai, all of Japan

[73] Assignee: Asmo Co., Ltd., Kosai, Japan

[21] Appl. No.: 25,671

[22] Filed: Mar. 3, 1993

Related U.S. Application Data

[62] Division of Ser. No. 888,122, May 26, 1992, Pat. No. 5,213,008.

[30] Foreign Application Priority Data

May 31, 1991 [JP] Japan .................. 3-129739

[51] Int. Cl.$^5$ ................................ B21B 1/46
[52] U.S. Cl. .................. 29/527.4; 74/579 R; 29/469.5
[58] Field of Search ............. 29/527.4, 469.5; 74/579 R

[56] References Cited

U.S. PATENT DOCUMENTS

| | | |
|---|---|---|
| 4,090,283 | 5/1978 | Woolley . |
| 4,613,251 | 9/1986 | Bellamy et al. . |
| 4,662,772 | 5/1987 | Schultz . |
| 4,695,180 | 3/1987 | Sato . |
| 4,872,396 | 10/1989 | Wimbush . |
| 4,903,386 | 2/1990 | Teramachi . |
| 4,918,806 | 4/1990 | Watanabe et al. . |
| 5,013,175 | 5/1991 | Hayden . |
| 5,092,703 | 3/1992 | Kobayashi . |
| 5,165,306 | 11/1992 | Hellon . |
| 5,213,008 | 5/1993 | Kanno et al. . |

FOREIGN PATENT DOCUMENTS

| | | |
|---|---|---|
| 452397 | 11/1948 | Canada . |
| 583753 | 8/1933 | Fed. Rep. of Germany . |
| 3843330 | 7/1990 | Fed. Rep. of Germany . |
| 1322001 | 2/1963 | France . |
| 1508265 | 1/1968 | France . |
| 2385935 | 10/1978 | France . |
| 0113620 | 7/1983 | Japan . |
| 189055 | 4/1964 | Sweden . |

*Primary Examiner*—Carl J. Arbes
*Attorney, Agent, or Firm*—Burns, Doane, Swecker & Mathis

[57] ABSTRACT

A link rod of a wiper for a motor vehicle, comprising: a cylindrical section; a pair of flat sections formed at opposite ends of the cylindrical section, respectively by crushing the opposite ends of the cylindrical section from above and below; and a pair of resinous coupling joints mounted on the flat sections, respectively; wherein a first hole having a large diameter and a second hole having a small diameter are, respectively, formed at outer and inner portions of each of the flat sections as viewed in a longitudinal direction of the cylindrical section; wherein a gap opens into an axially intermediate portion of a peripheral surface of the second hole such that interior of the cylindrical section is communicated with a mouth of the second hole through the gap; wherein each of the coupling joints includes a joint portion disposed at the first hole and seals the second hole and the gap, and a method of manufacturing the link rod.

4 Claims, 6 Drawing Sheets

METHOD OF MANUFACTURING A LINK ROD OF A WIPER FOR A MOTOR VEHICLE

This application is a divisional application Ser. No. 07/888,122, filed May 26, 1992, now U.S. Pat. No. 5,213,008 issued on May 25, 1993.

BACKGROUND OF THE INVENTION

The present invention generally relates to a link rod of a wiper for a motor vehicle and its manufacturing method and more particularly, to a link rod and its manufacturing method, which improve corrosion resistance of the link rod and reduce manufacturing processes of the link rod.

In response to recent increase of guaranteed life of motor vehicles, there is a growing demand for improvement of corrosion resistance of the motor vehicles. To this end, a link rod for driving a wiper of a motor vehicle is also subjected to cationic electrodeposition coating in order to improve its corrosion resistance.

A known finished link rod 1 subjected to cationic electrodeposition coating is shown in FIGS. 15 to 17 and is produced as follows. Initially, each of opposite end portions of a tubular member is crushed over a predetermined distance by stamping and then, is subjected to punching. Thus, a rod having a predetermined length is obtained in which flat sections 1A and 1B are provided at opposite ends of a cylindrical section 2. Subsequently, a large-diameter hole 4A and a small-diameter hole 5A are, respectively, formed at outer and inner portions of the flat section 1A by punching, while a large-diameter hole 4B and a small-diameter hole 5B are, respectively, likewise formed at outer and inner portions of the flat section 1B by punching. Thereafter, the rod is washed by using cleaning fluid and then, is subjected to cationic electrodeposition coating. Subsequently, the flat sections 1A and 1B are inserted into molds and resinous coupling joints 6A and 6B are molded integrally with the opposite ends of the link rod 1, respectively.

In the above described manufacturing processes of the known link rod 1, the opposite end portions of the tubular member are crushed by stamping so as to be sealed. Nevertheless, as shown in FIG. 17, a minute gap t1 is actually present between an upper plate portion 7A and a lower plate portion 7B. As a result, the cleaning fluid, the coating fluid, hot water, etc. penetrate into the cylindrical section 2 from the gap t1 during the washing process and the coating process. If the cleaning fluid or the coating fluid penetrates into the link rod 1, such problems arise that the cleaning fluid oozing out of the link rod 1 is mixed with the coating fluid so as to not only degrade finishing of the coated surface of the link rod but expedite deterioration of the coating fluid.

In order to eliminate such an inconvenience as described above, fluid drains 8A and 8B are, respectively, formed at opposite end portions of the cylindrical section 2 adjacent to the flat sections 11A and 11B such that the washing fluid penetrating into the cylindrical section 2 is discharged from the fluid drains 8A and 8B.

However, if the link rod 1 is mounted on the motor vehicle without covering the fluid drains 8A and 8B, air, salt water, etc. flow into the link rod 1 from the fluid drains 8A and 8B, thereby resulting in corrosion of the inner surface of the cylindrical section 2. Therefore, at the final manufacturing process of the link rod 1, putty is filled in the fluid drains 8A and 8B so as to form putty plugs 9A and 9B such that the fluid drains 8A and 8B are closed by the putty plugs 9A and 9B, respectively.

Therefore, if a link rod having excellent corrosion resistance should be obtained in the known manufacturing processes, the process of forming the fluid drains and the process of filling the putty in the fluid drains are required to be performed, thus resulting in increase of the number of the manufacturing processes, poor working efficiency and high manufacturing cost.

SUMMARY OF THE INVENTION

Accordingly, an essential object of the present invention is to provide a link rod including coupling joints having excellent corrosion resistance and its manufacturing method which enables easy manufacture of the link rod without increasing manufacturing processes of the link rod.

In order to accomplish this object of the present invention, a link rod of a wiper for a motor vehicle, according to the present invention comprises: a cylindrical section; a pair of flat sections which are, respectively, formed at opposite ends of said cylindrical section by crushing the opposite ends of said cylindrical section from above and below; and a pair of resinous coupling joints which are mounted on said flat sections, respectively; wherein a first hole having a large diameter and a second hole having a small diameter are, respectively, formed at outer and inner portions of each of said flat sections as viewed in a longitudinal direction of said cylindrical section; wherein a gap opens into an axially intermediate portion of a peripheral surface of the second hole such that interior of said cylindrical section is communicated with a mouth of the second hole through the gap; wherein each of said coupling joints includes a joint portion disposed at the first hole and seals the second hole and the gap.

Furthermore, the present invention provides a method of manufacturing the link rod of the above described arrangement, comprising the steps of: crushing each of opposite end portions of a tubular blank over a predetermined length by stamping; punching the opposite end portions of the tubular blank such that a rod body having a pair of flat sections provided at its opposite ends, respectively and a cylindrical section provided between the flat sections; punching a first hole having a large diameter and a second hole having a small diameter at outer and inner portions of each of the flat sections as viewed in a longitudinal direction of the rod body; wherein a gap opens into an axially intermediate portion of a peripheral surface of the second hole such that interior of the cylindrical section is communicated with a mouth of the second hole through the gap; washing the rod body with cleaning fluid; discharging from the mouth of the second hole, the cleaning fluid which has penetrated into the cylindrical section; coating the rod body; and molding a pair of resinous coupling joints integrally with the flat sections, respectively; wherein each of the coupling joints includes a joint portion disposed at the first hole and seals the second hole and the gap.

In the punching process of the small-diameter hole, a die formed continuously with a punching bore having a diameter corresponding to that of a punch and a recess disposed above the punching bore and having a diameter larger than that of the punching bore is employed.

In the link rod of the present invention, the gap opens into the axially intermediate portion of the peripheral surface of the small-diameter hole such that interior of the cylindrical section is communicated with the mouth of the small-diameter hole through the gap. Thus, even if the cleaning fluid, the coating fluid, etc. penetrate into the cylindrical section, these fluids can be easily and rapidly discharged from the cylindrical section.

Meanwhile, after coating of the rod body has been completed, the resinous coupling joints are molded integrally with the flat sections, respectively so as to seal the gap communicated with the small-diameter hole, namely, seal the cylindrical section.

BRIEF DESCRIPTION OF THE DRAWINGS

This object and features of the present invention will become apparent from the following description taken in conjunction with the preferred embodiment thereof with reference to the accompanying drawings, in which.

Before the description of the present invention proceeds, it is to be noted that like parts are designated by like reference numerals throughout several views of the accompanying drawings.

DETAILED DESCRIPTION OF THE INVENTION

Figure 1:
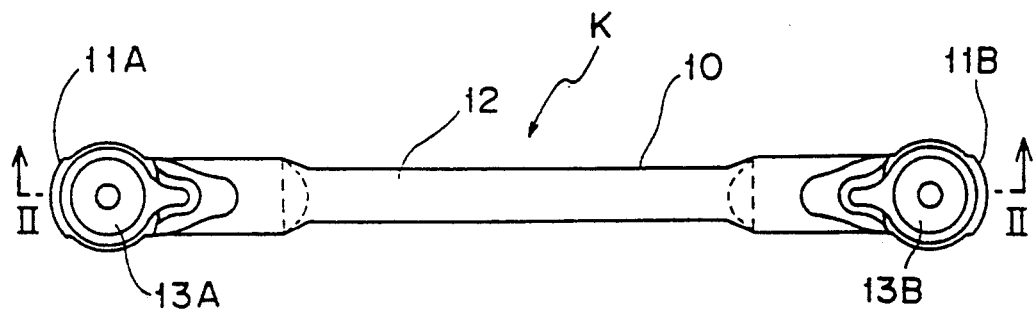
FIG. 1 is a top plan view of a link rod of a wiper for a motor vehicle, according to one embodiment of the present invention.
Figure 2:
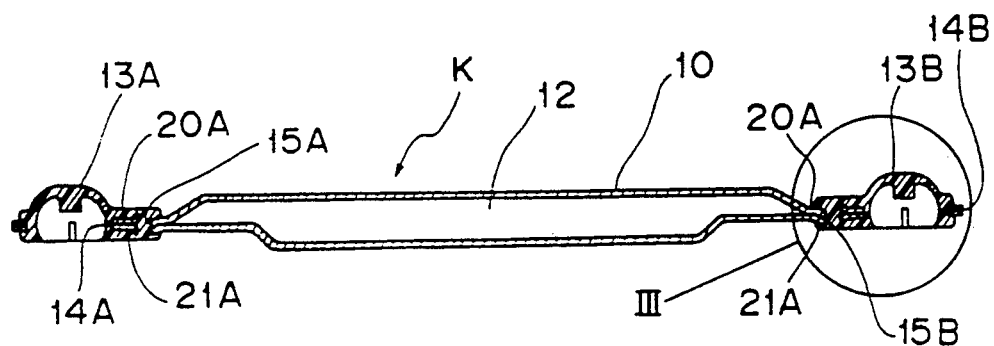
FIG. 2 is a sectional view taken along the lines II—II in FIG. 1.
Figure 3:
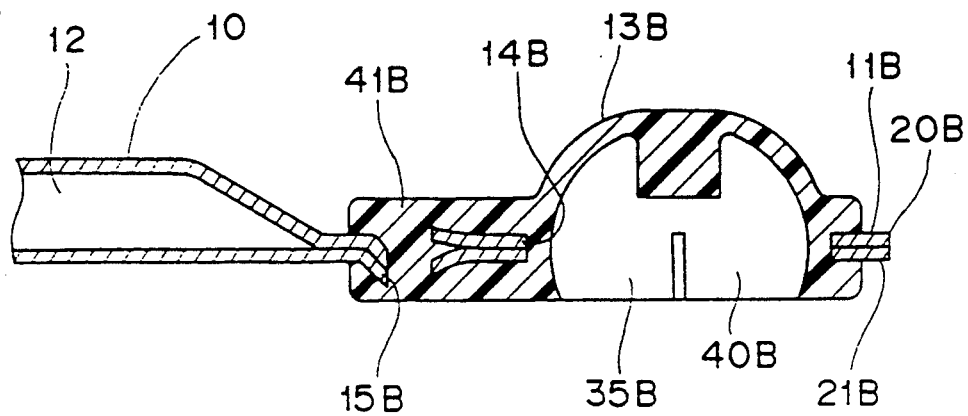
FIG. 3 is an enlarged view of the portion III in FIG. 2.
Figure 4:
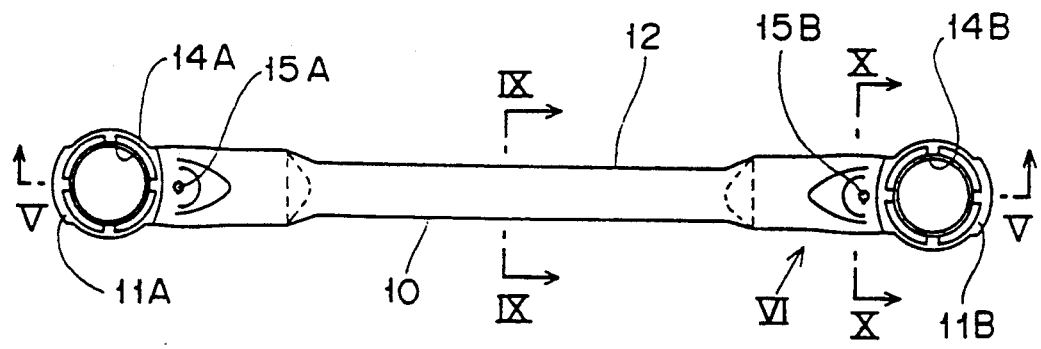
FIG. 4 is a top-plan view of a rod body of the link rod of FIG. 1.

Referring now to the drawings, there is shown in FIGS. 1 to 3, a link rod K for driving a wiper of a motor vehicle, according to one embodiment of the present invention. In a known manner, the link rod K includes flat sections 11A and 11B provided at opposite end portions thereof, a rod body 10 disposed between the flat portions 11A and 11B and resinous coupling joints 13A and 13B molded integrally with opposite ends of the rod body 10, respectively. The rod body 10 includes a cylindrical section 12.

As shown in detail in FIGS. 4 to 8, the flat sections 11A and 11B are formed by crushing opposite end portions of the cylindrical section 12. The flat section 11A includes an upper plate portion 20A and a lower plate portion 21A. Similarly, the flat section 11B includes an upper plate portion 20B and a lower plate portion 21B. The upper plate portions 20A and 20B have a length L1 smaller than a length L2 of the lower plate portions 21A and 21B. The upper plate portions 20A and 20B are, respectively, connected with the cylindrical section 12 through oblique portions 22A and 22B, while the lower plate portions 21A and 21B are, respectively, connected with the cylindrical section 12 through oblique portions 23A and 23B. A large-diameter hole 14A and a small-diameter hole 15A are, respectively, formed at outer and inner portions of the flat section 11A as viewed in a longitudinal direction of the cylindrical section 12. Likewise, a large-diameter hole 14B and 15B are, respectively, formed at outer and inner portions of the flat section 11B as viewed in the longitudinal direction of the cylindrical section 12.

Figure 7:
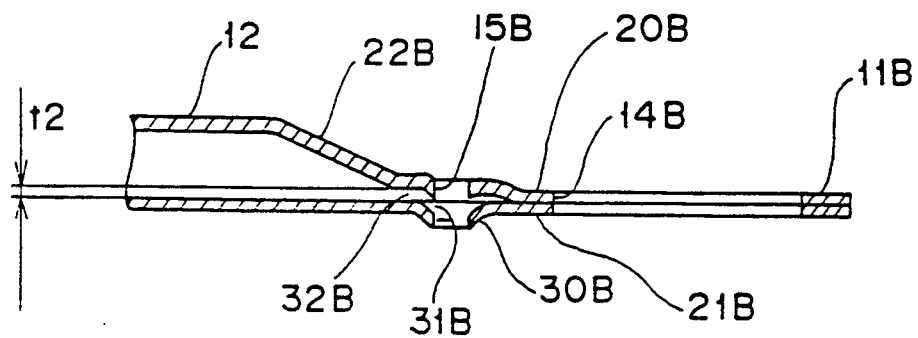
FIG. 7 is a sectional view taken along the line VII-—VII in FIG. 6.
Figure 8:
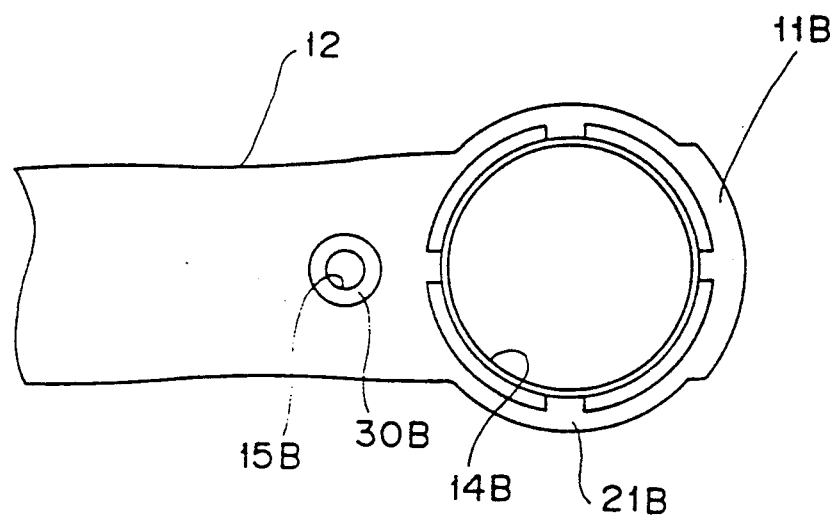
FIG. 8 is a rear view of FIG. 6.
Figure 9:
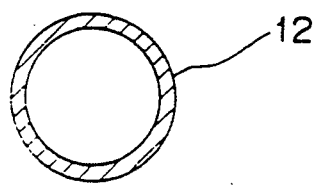
FIG. 9 is a sectional view taken along the line IX—IX in FIG. 4.
Figure 10:
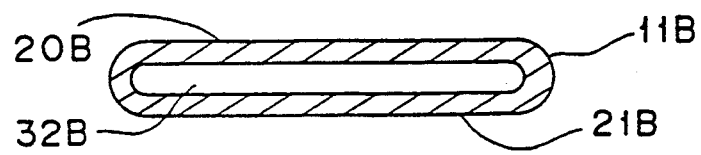
FIG. 10 is a sectional view taken along the line X—X in FIG. 4.

As shown in FIG. 7, the upper and lower plate portions 20B and 21B which constitute the flat section 11B are brought into close contact with each other at a periphery of the large-diameter hole 14B. In the same manner, the upper and lower plate portions 20A and 21A of the flat section 11A are also brought into close contact with each other at a periphery of the large-diameter hole 14A. On the other hand, a lower mouth of the small-diameter hole 15B projects downwardly from the lower plate portion 21B so as to form a boss 30B by a manufacturing process to be described later such that not only a gap 31B is formed between the upper and lower plate portions 20B and 21B but the gap 31B leads to a gap 32B having a size t2 and communicated with interior of the cylindrical section 12. Namely, interior of the cylindrical section 12 shown in FIG. 9 is communicated, through the gap 32B shown in FIG. 10, with the mouth of the small-diameter hole 14B and thus, is communicated with exterior of the link rod K. Since the same construction as described above is employed at the other small-diameter hole 15A, description thereof is abbreviated for the sake of brevity.

As shown in FIG. 3, the coupling joints 13A and 13B are made of resin and are molded integrally with the flat sections 11A and 11B, respectively. Meanwhile, the coupling joint 13B includes a joint portion 40B disposed adjacent to the large-diameter hole 14B and a support sealing portion 41B. The joint portion 40B is formed by a hemispherical shell and is provided for coupling the joint rod K with another member (not shown) of the wiper. Meanwhile, the support sealing portion 41B not only is filled in the small-diameter hole 15B and the gap 31B communicated with the small-diameter hole 15B so as to support the joint portion 40B but seals the cylindrical section 12 from outside. Since the coupling joint 13A has the same construction as the coupling joint 13B, description thereof is abbreviated for the sake of brevity.

Figure 5:
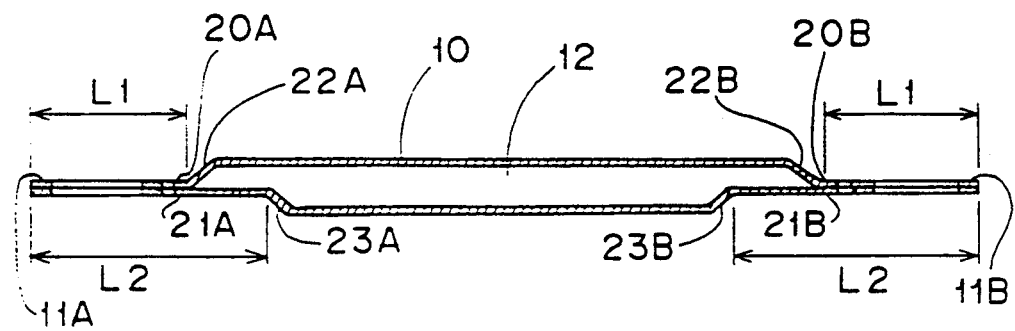
FIG. 5 is a sectional view taken along the line V—V in FIG. 4.
Figure 6:
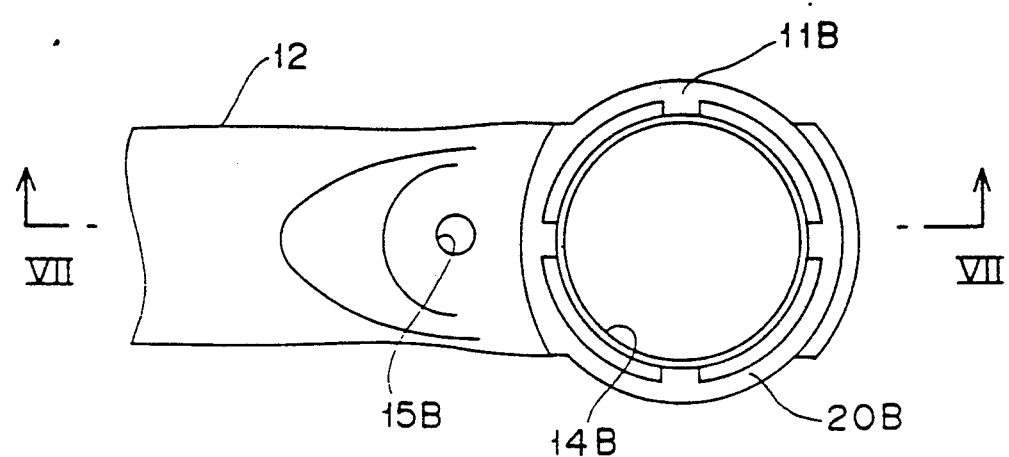
FIG. 6 is an enlarged view of the portion VI in FIG. 4.

Then, a manufacturing method of the link rod K, according to the present invention is described. Each of opposite end portions of a tubular blank is crushed over a predetermined distance by stamping and is subjected to punching. Thus, the rod body 10 of FIG. 5 is obtained in which the flat sections 11A and 11B are provided at the opposite ends of the cylindrical section 12. At the time of the punching, it is so arranged that a gap of about 0.5 mm is formed between the upper and lower plate portions 20A and 21A of the flat section 11A in the vicinity of the cylindrical section 12 and between the upper and lower plate portions 20B and 21B of the flat section 11B in the vicinity of the cylindrical section 12.

Then, a large-diameter hole 14A and a small-diameter hole 15A are formed at the flat section 11A by punching. Similarly, a large-diameter hole 14B and a small-diameter hole 15B are formed at the flat section 11B by punching.

Figure 13:
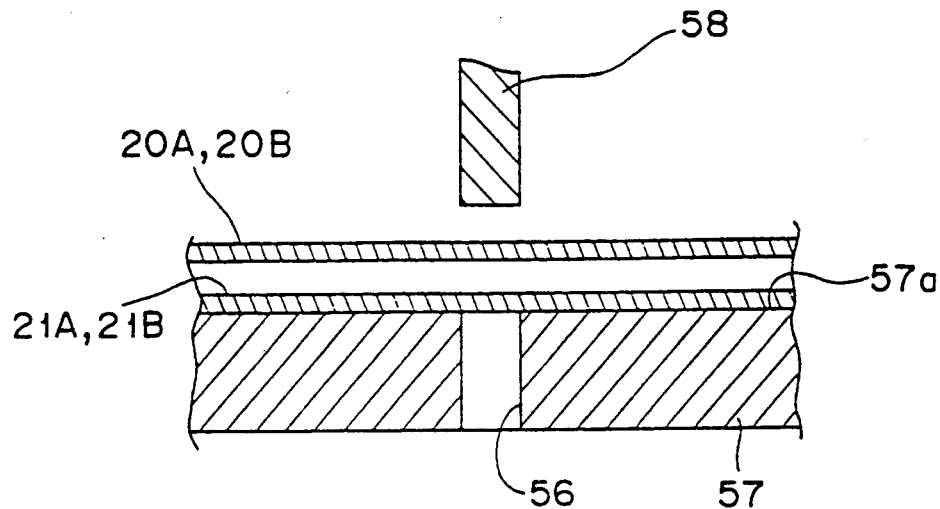
FIGS. 13 and 14 are schematic sectional view showing an ordinary punching process as a comparative example.
Figure 14:
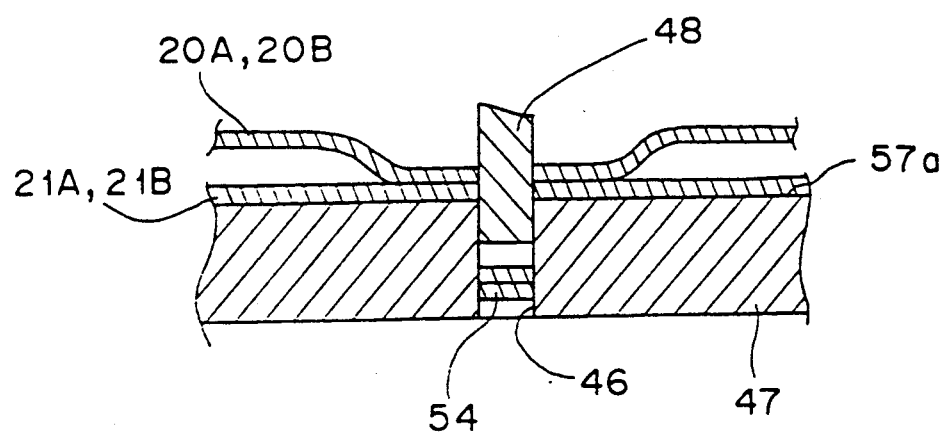
Figure 15:
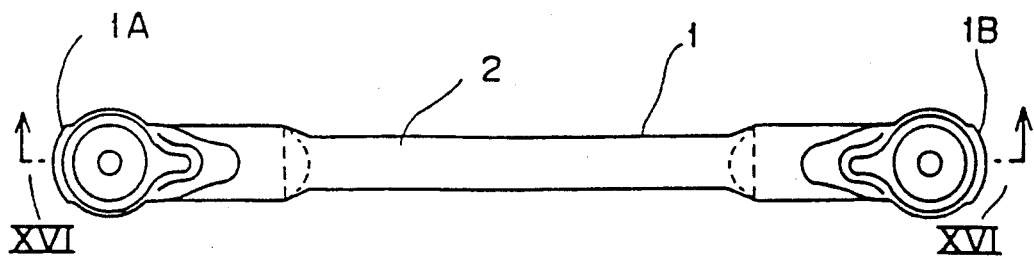
FIG. 15 is a top plan view of a prior art link rod (already referred to)
Figure 16:
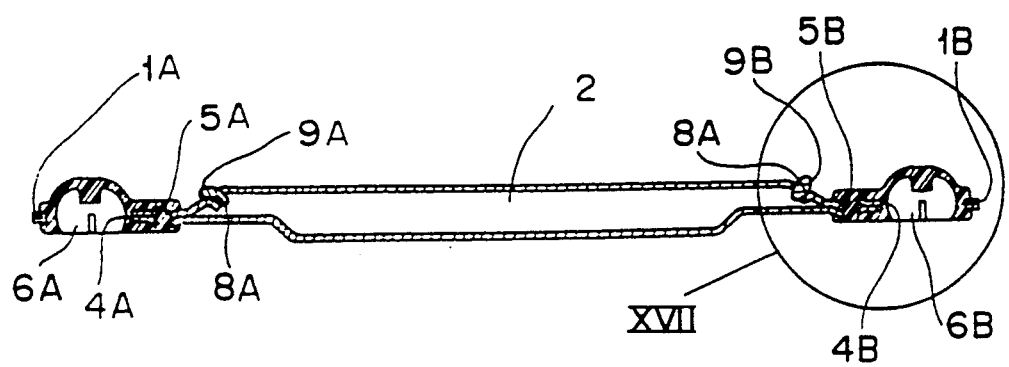
FIG. 16 is a sectional view taken along the line XVI-—XVI in FIG. 15.
Figure 17:
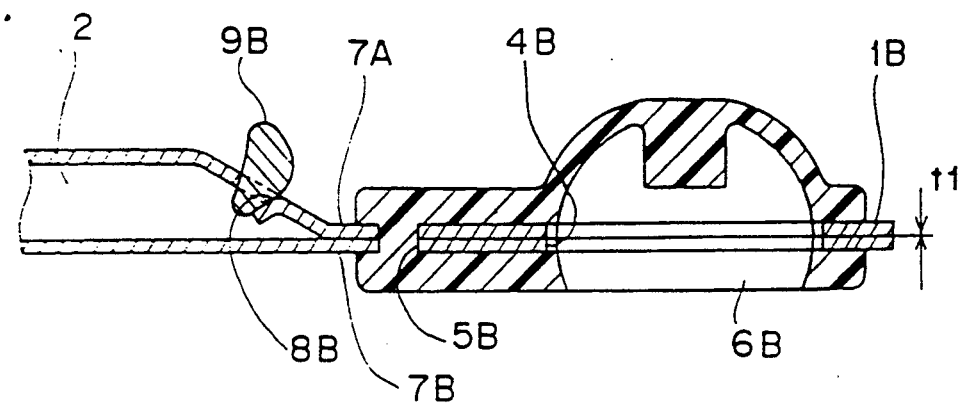
FIG. 17 is an enlarged view of the portion XVII in FIG. 16.

When the small-diameter hole 15A or 15B is formed by punching, it is usually so arranged as shown in FIGS. 13 and 14. Namely, the lower plate portion 21A or 21B of the flat section 11A or 11B is placed on an upper face 57a of a die 57 formed with a punching bore 56 having a predetermined diameter. Then, a punch 58 having a diameter corresponding to that of the punching bore 56 is displaced downwardly in FIG. 13 so as to punch the small-diameter hole 15A or 15B. Since diameter of the punching bore 56 is fixed in the axial direction of the punching bore 56, the upper plate portion 20A or 20B is brought into close contact with the lower plate portion 21A or 21B at an outer peripheral portion of the punching bore 56 undesirably.

Figure 11:
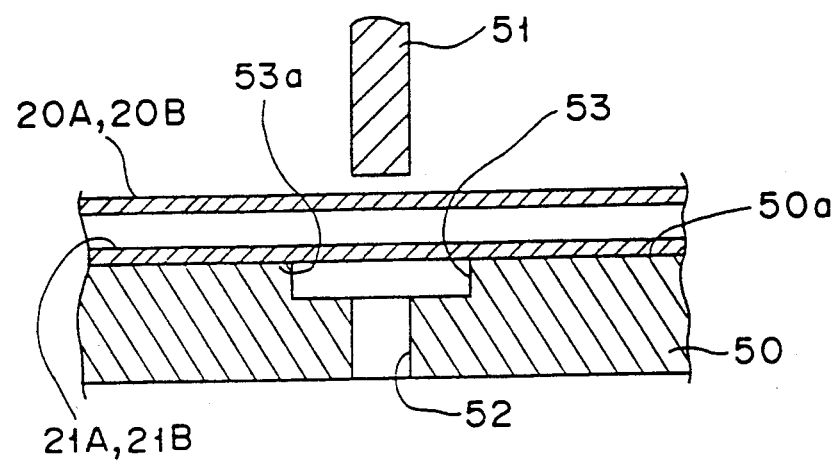
FIGS. 11 and 12 are schematic sectional views showing a punching process employed in a manufacturing method of the present invention.
Figure 12:
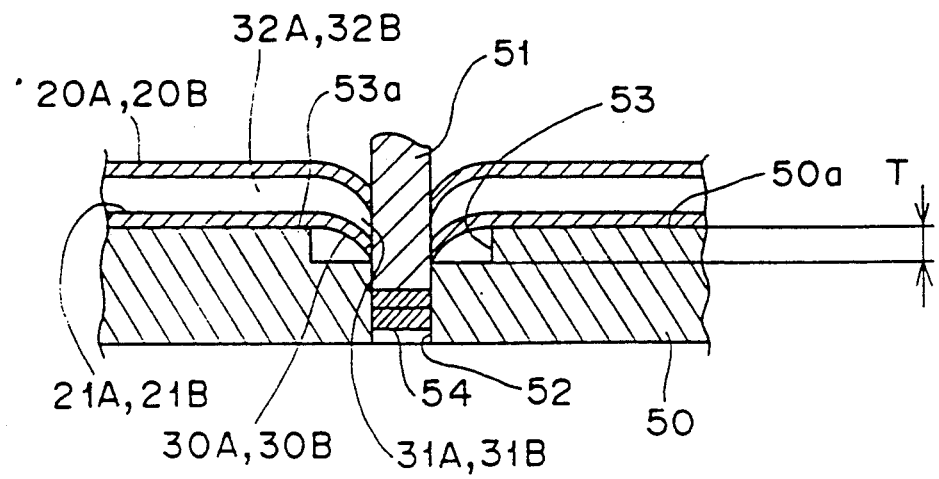

On the other hand, in the manufacturing method of the present invention, a die 50 shown in FIGS. 11 and 12 is employed for forming the small-diameter hole 15A or 15B. The die 50 is formed with a stepped bore, i.e. recess 53 formed on an upper face 50a of the die 50 to a predetermined depth T and a punching bore 52 passing through the die 50 coaxially with the recess 53. The punching bore 52 has a diameter substantially equal to that of a punch 51, while the recess 53 has a diameter larger than that of the punching bore 52.

The lower plate portion 20A or 20B of the flat section 11A or 11B is placed on the upper face 50a of the die 50 and then, the punch 51 is depressed downwardly in FIG. 11. In response to displacement of the punch 51, the upper plate portion 20A or 20B and the lower plate portion 21A or 21B are bent into the recess 53 at an edge 53a of the recess 53. When the punch 51 is further displaced downwardly, a central part of each of the bent portions of the upper plate portions 20A or 20B and the lower plate portions 21A or 21B is sheared by the punch 51 and the punching bore 52 so as to be discharged, as a punching residue 54, out of the punching bore 52. As a result, the small-diameter hole 15A or 15B is formed.

At this time, since the recess 53 is formed above the punching bore 52 as described above, each of the upper plate portion 20A or 20B and the lower plate portion 21A or 21B is bent into the recess 53 at a periphery of the small-diameter hole 15A or 15B. Hence, at the periphery of the small-diameter hole 15A or 15B, the boss 30A or 30B is formed on the lower plate portion 21A or 21B. Furthermore, since the upper plate portion 20A or 20B is held out of close contact with the lower plate portion 21A or 21B at the periphery of the small-diameter hole 15A or 15B, the gap 31A or 31B opening into the small-diameter hole 15A or 15B and the gap 32A or 32B connecting the gap 31A or 31B with interior of the cylindrical section 12 can be secured.

When the rod body 10 has been formed, the rod body 10 is washed such that oil, etc. used during punching are removed from the rod body 10. In the case where cleaning fluid penetrates into the cylindrical section 12 during the washing process, the cleaning fluid in the cylindrical section 12 can be easily discharged from the small-diameter hole 15A or 15B through the gap 32A or 32B and the gap 31A or 31B. A period required for discharging the cleaning fluid from the cylindrical section 12 is usually about 30 sec. Therefore, in the manufacturing method of the present invention, deterioration, etc. of coating fluid caused by flow of the cleaning fluid into the coating fluid can be easily prevented.

Subsequently, the rod body 10 is subjected to cationic electrodeposition coating. In this coating process, also when the coating fluid, hot water, etc. flow into the cylindrical section 12, the coating fluid, hot water, etc. can be easily and rapidly discharged from the small-diameter holes 15A and 15B. After the coating process of the rod body 10 has been completed, the resinous coupling joints 13A and 13B are molded integrally with the flat sections 11A and 11B. At this time, resin forming the coupling joints 13A and 13B closes the gaps 32A and 32B so as to seal interior of the cylindrical section 12. Meanwhile, such a phenomenon may happen in which the gaps 32A and 32B are closed by clamping force of molds used at the time of integral molding of the coupling joints 13A and 13B.

In the link rod of the present invention, a special discharge hole for discharging liquid in the cylindrical section is not provided and a plug member for closing the discharge hole are not required to be provided. Therefore, in the manufacturing method of the present invention, a process of forming the discharge liquid and a process of closing the discharge hole can be eliminated in contrast with a known manufacturing method.

As is clear from the foregoing description, in the link rod of the present invention, since the cleaning fluid, etc. penetrating into the cylindrical section is discharged by communicating the small-diameter hole of the flat section with the cylindrical section without the need for providing a special discharge hole for discharging the cleaning fluid, etc. in the cylindrical section, the link rod is simplified structurally.

Meanwhile, in the manufacturing method of the present invention, since the cleaning fluid, etc. can be discharged from the cylindrical section easily and rapidly, deterioration, etc. of the coating fluid can be prevented easily.

Furthermore, in accordance with the manufacturing method of the present invention, since the special discharge hole for discharging the cleaning fluid, etc. from the cylindrical section is not required to be provided as described above, the process of forming the discharge hole and the process of closing the discharge hole can be eliminated, thereby resulting in reduction of manufacturing cost of the link rod.

What is claimed is:

1. A method of manufacturing a link rod of a wiper of a motor vehicle, comprising the steps of:

crushing each of opposite end portions of a tubular blank over a predetermined length by stamping;

punching the opposite end portions of the tubular blank such that a rod body having a pair of flat sections provided at its opposite ends, respectively and a cylindrical section provided between the flat sections;

punching a first hole having a large diameter and a second hole having a small diameter at outer and inner portions of each of the flat sections, respectively as viewed in a longitudinal direction of the rod body;

wherein a gap opens into an axially intermediate portion of a peripheral surface of the second hole such that interior of the cylindrical section is communicated with a mouth of the second hole through the gap;

washing the rod body with cleaning fluid;

discharging from the mouth of the second hole, the cleaning fluid which has penetrated into the cylindrical section;

coating the rod body; and molding a pair of resinous coupling joints integrally with the flat sections, respectively;

wherein each of the coupling joints includes a joint portion disposed at the first hole and seals the second hole and the gap.

2. A method as claimed in claim 1, wherein the gap includes a first gap portion and a second gap portion, the second gap portion being closed when the gap and the second hole are sealed.

3. A method as claimed in claim 1, wherein when the second hole is punched, a die having a recess formed on an upper face of the die and a punching bore passing through the die coaxially with the recess is employed.

4. A method as claimed in claim 3, wherein when the second hole is punched, a punch is depressed against each of the flat sections placed on the upper face of the die such that a depressed portion of each of the flat sections is sheared by the punch and the punching bore.

* * * * *